US012546759B2

(12) United States Patent
Nour et al.

(10) Patent No.: US 12,546,759 B2
(45) Date of Patent: *Feb. 10, 2026

(54) THIN POLYMER FILM DISSOLVED UNDER TENSION TO DETECT HYDROCARBON FUELS HIDDEN IN PARAFFIN-BASED LUBRICATION OILS

(71) Applicants: Saudi Arabian Oil Company, Dhahran (SA); King Abdullah University of Science and Technology, Thuwal (SA)

(72) Inventors: Maha Nour, Thuwal (SA); Abdullah Hassan Bukhamsin, Thuwal (SA); Esraa Fakeih, Thuwal (SA); Sumana Bhattacharjee, Thuwal (SA); Khaled Nabil Salama, Thuwal (SA)

(73) Assignees: Saudi Arabian Oil Company, Dhahran (SA); King Abdullah University of Science and Technology, Thuwal (SA)

( * ) Notice: Subject to any disclaimer, the term of this patent is extended or adjusted under 35 U.S.C. 154(b) by 302 days.

This patent is subject to a terminal disclaimer.

(21) Appl. No.: 18/128,903

(22) Filed: Mar. 30, 2023

(65) Prior Publication Data
US 2024/0329030 A1    Oct. 3, 2024

(51) Int. Cl.
*G01N 33/28*    (2006.01)
*G01N 27/12*    (2006.01)

(52) U.S. Cl.
CPC ....... *G01N 33/2835* (2013.01); *G01N 27/122* (2013.01); *G01N 27/126* (2013.01); *G01N 27/128* (2013.01); *G01N 33/2888* (2013.01)

(58) Field of Classification Search
CPC .. G01N 27/122; G01N 27/126; G01N 27/128; G01N 33/2835; G01N 33/2888
See application file for complete search history.

(56) References Cited

U.S. PATENT DOCUMENTS 3,156,644 A    11/1964    Kunin
4,031,398 A    6/1977    Callis et al.
(Continued)

FOREIGN PATENT DOCUMENTS

| EP | 3721985 A1 | * 10/2020 |
|---|---|---|
| FR | 2817346 | 5/2002 |
| WO | WO 2020047469 | 3/2020 |

OTHER PUBLICATIONS

Aboaba et al., "Brain tumor quantification equation: Modeled on complete step response algorithm," presented at the International Conference on Computer and Communication Engineering, Kuala Lumpur, Malaysia, Jul. 3-5, 2012 4 pages.
(Continued)

*Primary Examiner* — Neel D Shah
*Assistant Examiner* — Adam S Clarke
(74) *Attorney, Agent, or Firm* — Fish & Richardson P.C.

(57) ABSTRACT

Systems and methods include a computer-implemented method for determining hydrocarbon fuel concentrations. A thin Cyclic Olefin Copolymer (COC) film of a COC layer with a conductive trace that completes an electrical circuit is sputtered. The thin COC film is positioned under tension so that the thin COC film is configured to dissolve upon contact with alkyl aromatic compounds present in hydrocarbon fuels. A sample of a hydrocarbon fuel is positioned on the thin COC film. A determination is made, in response to positioning the sample, that a dissolution of the thin COC film has broken the conductive trace and has rendered the electrical circuit open. A time duration is measured from an introduction of the sample during positioning to an opening of the electrical circuit. A concentration of the hydrocarbon fuel in the sample is determined based on the time duration.

20 Claims, 3 Drawing Sheets

(56) References Cited

U.S. PATENT DOCUMENTS

| | | | |
|---|---|---|---|
| 4,307,061 | A | 12/1981 | Sarholz |
| 4,651,010 | A | 3/1987 | Javan |
| 5,422,719 | A | 6/1995 | Goldstein |
| 5,818,582 | A | 10/1998 | Fernandez et al. |
| 5,899,567 | A | 5/1999 | Morris, Jr. |
| 5,982,847 | A | 11/1999 | Nelson |
| 6,023,961 | A | 2/2000 | Discenzo |
| 6,507,401 | B1 | 1/2003 | Turner |
| 6,525,325 | B1 | 2/2003 | Andrews et al. |
| 6,692,720 | B1 | 2/2004 | Ninane et al. |
| 6,707,556 | B2 | 3/2004 | Turner |
| 6,911,830 | B2 | 6/2005 | Heremans et al. |
| 7,442,291 | B1 | 10/2008 | Discenzo |
| 7,839,492 | B2 | 11/2010 | Parks, II et al. |
| 8,017,408 | B2 | 9/2011 | Meinhart et al. |
| 8,390,796 | B2 | 3/2013 | Honda |
| 8,408,073 | B2 | 4/2013 | Sparks et al. |
| 8,704,174 | B2 | 4/2014 | Ukon |
| 8,910,514 | B2 | 12/2014 | Sullivan et al. |
| 9,206,386 | B2 | 12/2015 | Tunheim et al. |
| 9,255,875 | B2 | 2/2016 | Denenberg et al. |
| 9,518,918 | B2 | 12/2016 | Mann et al. |
| 9,822,356 | B2 | 11/2017 | Ismagilov et al. |
| 10,060,899 | B2 | 8/2018 | Hegazi et al. |
| 10,100,966 | B2 | 10/2018 | Vermont et al. |
| 10,317,388 | B2 | 6/2019 | Hegazi et al. |
| 10,502,409 | B2 | 12/2019 | Meinhart et al. |
| 10,643,324 | B2 | 5/2020 | Al Shehri et al. |
| 10,768,094 | B2 | 9/2020 | Amer et al. |
| 10,908,069 | B2 | 2/2021 | Amer et al. |
| 2002/0158211 | A1 | 10/2002 | Gillispie |
| 2003/0133105 | A1 | 7/2003 | Gorelik et al. |
| 2003/0141459 | A1 | 7/2003 | Hegazi et al. |
| 2004/0007675 | A1 | 1/2004 | Gillispie et al. |
| 2004/0124366 | A1 | 7/2004 | Zeng et al. |
| 2006/0114007 | A1 | 6/2006 | Cho |
| 2007/0009423 | A1 | 1/2007 | Handy et al. |
| 2007/0063140 | A1 | 3/2007 | Liu |
| 2007/0095395 | A1 | 5/2007 | Spiess |
| 2007/0187617 | A1 | 8/2007 | Kong |
| 2009/0006004 | A1 | 1/2009 | Sens et al. |
| 2009/0216419 | A1 | 8/2009 | Shaw |
| 2010/0039124 | A1* | 2/2010 | Belbruno ............. G01N 27/127 977/773 |
| 2010/0269579 | A1 | 10/2010 | Lawrence et al. |
| 2011/0155925 | A1 | 6/2011 | Ukon |
| 2011/0166802 | A1 | 7/2011 | Kong |
| 2011/0236569 | A1 | 9/2011 | Weiller |
| 2011/0267603 | A1 | 11/2011 | Shaw |
| 2011/0303834 | A1 | 12/2011 | Hegazi et al. |
| 2012/0086942 | A1 | 4/2012 | Honda |
| 2013/0333893 | A1 | 12/2013 | Morris |
| 2014/0198313 | A1 | 7/2014 | Tracy et al. |
| 2015/0009495 | A1 | 1/2015 | Li et al. |
| 2015/0085290 | A1 | 3/2015 | Fjerdingstad |
| 2015/0168368 | A1 | 6/2015 | Hegazi et al. |
| 2016/0195509 | A1 | 7/2016 | Jamieson |
| 2016/0202194 | A1 | 7/2016 | Lees |
| 2016/0349198 | A1 | 12/2016 | Barney |
| 2019/0302046 | A1* | 10/2019 | Yoshioka ............. G01N 27/124 |
| 2021/0255039 | A1 | 8/2021 | Morgan, III |
| 2021/0389264 | A1 | 12/2021 | Ito et al. |
| 2023/0314402 | A1 | 10/2023 | Nour et al. |

OTHER PUBLICATIONS

Agha et al., "A Review of Cyclic Olefin Copolymer Applications in Microfluidics and Microdevices," Macromolecular Materials and Engineering, 2022, 307(2200053):1-34, 35 pages.

Al-Abdullah et al., "Flash points and volatility characteristics of gasoline/diesel blends," Fuel, Aug. 2015, 153:67-69, 3 pages.

Al-Samhan et al., "Evaluating scale deposition and scale tendency of effluent water mix with seawater for compatible injection water," Journal of Petroleum Exploration and Production Technology, Jun. 2020, 10(5):2105-2111, 7 pages.

Álvarez et al., "Prediction of Flash-Point Temperature of Alcohol/Biodiesel/Diesel Fuel Blends," Industrial Engineering Chemistry Research, Apr. 2019, 58(16):6860-6869, 10 pages.

Beck et al., "Development and characterization of a mobile photoacoustic sensor for on-line soot emission monitoring in diesel exhaust gas," in Analytical and Bioanalytical Chemistry, Apr. 2003, 375(8):1136-1143, 8 pages.

Bedoui et al., "Design and electro-thermal analysis of a platinum micro heater for gas sensors," 13th Int. Multi-Conference Syst. Signals Devices, SSD 2016, 4:558-561, 4 pages.

Bernasconi et al., "Advanced pipeline vibroacoustic monitoring," Pressure Vessels and Piping Conference, Jul. 2013, 5:7, 7 pages.

Bhavani et al., "Diesel to Dual Fuel Conversion Process Development," Artic. Int. J. Eng. Technol., 2018, 7(3):306-310, 5 pages.

Bieler et al., "Calibration of the step response of a 70 GHz sampling oscilloscope using a novel optoelectronic technique," Conference on Precision Electromagnetic Measurements Digest, CPEM Jun. 8-13, 2008, 678-679, 2 pages.

Bridges et al., "Small-signal step response of laser amplifiers and measurement of CO2 laser linewidth," IEEE Journal of Quantum Electronics, Nov. 1968, 4(11): 777-782, 6 pages.

Brueckner et al., "Tunable diode laser absorption spectroscopy as method of choice for non-invasive and automated detection of microbial growth in media fills," Talanta, May 2017, 167:21-29, 9 pages.

Butler et al., "Prediction of Flash Points of Middle Distillates," Ind. Eng. Chem., Apr. 1956, 48(4):808-812, 5 pages.

Calaon et al., "Injection and injection-compression moulding replication capability for the production of polymer lab-on-a-chip with nano structures," Journal of Micromechanics and Microengineering, Sep. 12, 2017, 27(10), 13 pages.

Chan et al., "Size-controlled growth of CdSe nanocrystals in microfluidic reactors," Nano Lett., Feb. 2003, 3(2):199-201, 3 pages.

Chen et al., "3D-printed microfluidic devices: fabrication, advantages and limitations—a mini review," Analytical Methods, Aug. 2016, 8(31):6005-6012, Aug. 21, 2016, 8 pages.

COC Topas Product Brochure, Section 4.2; Table 2, Mar. 2006, 20 pages.

Demirbas et al., "Diesel Fuel From Waste Lubricating Oil by Pyrolitic Distillation," Pet. Sci. Technol., 33(2): 129-138, Dec. 2015, 12 pages.

Fiorentin et al., "Effect of the finite memory length of a recorder in evaluating its frequency response of from step response," Instrumentation and Measurement Technology Conference, May 21-23, 2002, Proceedings of the 19th IEEE, 1: 787-791, 5 pages.

Foerster et al., "In situ monitoring of microfluidic distillation" Chemical Engineering Journal, 227: 13-21, 2013, 9 pages.

Ghosh et al., "A mass manufacturable thermoplastic based microfluidic droplet generator on cyclic olefin copolymer," Journal of Micromechanics and Microengineering, Apr. 2019, 10 pages.

Giordano et al., "Distilling small volumes of crude oil," Fuel, 285: 119072, Feb. 2021, 8 pages.

Gülüm et al., "Density, flash point and heating value variations of corn oil biodiesel-diesel fuel blends," Fuel Process. Technol., Jun. 2015, 134:456-464, 9 pages.

Hafeez et al., "Liquid fuel synthesis in microreactors," React. Chem. Eng., Aug. 2018, 3(4):414-432, 19 pages.

Hartman et al., "Distillation in microchemical systems using capillary forces and segmented flow," Lab Chip, 9(13): 1843-1849, Jul. 2009, 8 pages.

Hartman et al., "Multistep microchemical synthesis enabled by microfluidic distillation," Angew. Chemie—Int. Ed., 49(5): 899-903, Jan. 2010, 5 pages.

Hibara et al., "Microfluidic distillation utilizing micro-nano combined structure," Chem. Lett., 37(10): 1064-1065, Sep. 2008, 2 pages.

Hossain et al., "Designing of Hollow Core Grapefruit Fiber Using Cyclo Olefin Polymer for the Detection of Fuel Adulteration in Terahertz Region," Polymers, Dec. 29, 2022, 15(151):1-15, 15 pages.

(56) References Cited

OTHER PUBLICATIONS

Hua et al., "Determination of sulfur-containing compounds in diesel oils by comprehensive two-dimensional gas chromatography with a sulfur chemiluminescence detector," in Journal of Chromatography A, Nov. 2003, 1019(1-2):101-109, 9 pages.
Jain et al., "Design and Simulation of Microfluidic Passive Mixer With Geometric Variation," International Journal of Research Engineering Technology, Feb. 2016, 5:55-58, 4 pages.
Jena et al., "Cyclic olefin copolymer based microfluidic devices for biochip applications: Ultraviolet surface grafting using 2-methacryloyloxyethyl phosphorylcholine," Biomicrofluidics, Mar. 2012, 17 pages.
Jena et al., "Micro fabrication of cyclic olefin copolymer (COC) based microfluidic devices," Microsystem Technologies, Feb. 2012, 18(2):159-166, 8 pages.
Jiménez et al., "Chemiluminescence detection systems for the analysis of explosives," J. Hazard. Mater., Jan. 2004, 106(1): 1-8, 8 pages.
Jinno et al., "Identification of polycyclic aromatic hydrocarbons in extracts of diesel particulate matter by supercritical fluid chromatography coupled with an ultraviolet multichannel detector," Analytical Chemistry, 1986, 58(13): 2696-2699, 4 pages.
Kan et al., "Scale Prediction for Oil and Gas Production," SPE Journal, Feb. 2012, 17(2):362-378, 17 pages.
Karnati et al., "Design of Micro-heaters Inspired by Space Filling Fractal Curves," Proc. 2019 IEEE Reg. 10 Symp. TENSYMP 2019, Aug. 2019, 231-236, 6 pages.
Kimmich et al., "Fault detection for modern Diesel engines using signal- and process model-based methods," Control Engineering Practice, Feb. 2005, 13(2):189-203, 15 pages.
Kothare et al., "Microreactors for efficient on-chip fuel processing and hydrogen generation," Nanofabrication: Technologies, Devices, and Applications, Jan. 2005, 5592(19):241, 15 pages.
Kraus et al., "An integrated multiphase flow sensor for microchannels," Exp. Fluids, Jun. 2004, 36(6):819-832, 14 pages.
Lam et al., "Development of multistage distillation in a microfluidic chip," Lab Chip, 11(7):1311-1317, Apr. 2011, 7 pages.
Lam et al., "Towards an understanding of the effects of operating conditions on separation by microfluidic distillation," Chem. Eng. Sci., 66(10): 2098-2106, May 2011, 9 pages.
Lamonte et al., "Cyclic Olefin Copolymers," Advanced Materials & Processes, Mar. 2001, 159(3):33-36, 4 pages.
Li et al., "Isoelectric focusing in cyclic olefin copolymer microfluidic channels coated by polyacrylamide using a UV photografting method," Electrophoresis, May 2005, 26(9):1800-1806, 7 pages.
Lin et al., "Integrated microfluidic reactors," Nano Today, Dec. 2009, 4(6):470-481, 12 pages.
Liu et al., "Micro-distillation system for formaldehyde concentration detection," Chem. Eng. J., 304: 419-425, Nov. 2016, 7 pages.
Ljubas et al., "Influence of engine oils dilution by fuels on their viscosity, flash point and fire point," NAFTA, 2010, 61(2):73-79, 7 pages.
McGann et al., "Lean fuel detection with nanosecond-gated laser-induced breakdown spectroscopy," Combustion and Flame, Feb. 2021, 23 pages.
McGuire et al., "Detection of the aromatic molecule benzonitrile (c-C6H5CN) in the interstellar medium," Science 359, Jan. 2018, 34 pages.
Mehra et al., "Six-wafer combustion system for a silicon micro gas turbine engine," J. Microelectromechanical Syst., Dec. 2000, 9(4):517-527, 11 pages.
Mendonca et al., "Application of step response impedance spectroscopy for detection of skin irritation," Engineering in Medicine and Biology Society, Sep. 17-21, 2003; Proceedings of the 25th Annual International Conference of the IEEE, 4: 3215-3217, 3 pages.
mitsuichemicals.com [online], "APEL," 2020, retrieved on Feb. 14, 2022, retrieved from URL <https://jp.mitsuichemicals.com/en/special/apel/about/properties/>, 7 pages.
Mulrooney et al., "Detection of carbon dioxide emissions from a diesel engine using a mid-infrared optical fibre based sensor," Sensors Actuators, A Phys., May 2007, 136(1):104-110, 7 pages.
Nunes et al., "Cyclic olefin polymers: emerging materials for lab-on-a-chip applications," Microfluid Nanofluid, Apr. 2010, 9:145-161, 17 pages.
Olajire, "A review of oilfield scale management technology for oil and gas production," Journal of Petroleum Science and Engineering, Nov. 2015, 135:723-737, 45 pages.
Petermann, "Chapter 4: Intensity-Modulation Characteristics of Laser Diodes," Laser diode modulation and Noise, Kluwer Academic, 1991, 78-118.
Rowland et al., "The Automated Assessment of Ultrasound Scanner Lateral and Slice Thickness Resolution: Use of the Step Response," Ultrasound in Medicine & Biology, 35(9): 1525-1534, Sep. 2009, 10 pages.
Schuresko et al., "Carboxylation kinetics of hemoglobin and myoglobin: linear transient response to step perturbation by laser photolysis," Biophysical Journal, 24(1): 382-383, Oct. 1978, 2 pages.
Seo et al., "Continuous microfluidic reactors for polymer particles," Langmuir, Dec. 2005, 21(25):11614-11622, 9 pages.
Soud, "Downstream oil theft: countermeasures and good practices," Atlantic Council, May 2020, retrieved on Feb. 16, 2022, retrieved from URL <https://www.atlanticcouncil.org/wp-content/uploads/2020/05/AC_OilTheft-Final-1.pdf>, 56 pages.
Spannhake et al., "High-temperature MEMS heater platforms: Long-term performance of metal and semiconductor heater materials," Sensors, Apr. 2006, 6(4):405-419, 15 pages.
Sumitomo Heavy Industries Process Equipment Co., Ltd., "Consider a mixing vessel as a huge viscometer." Accessed: Aug. 20, 2020. [Online]. Available: https://www.shi-pe.shi.co.jp/english/technology/mixing-lecture/004/index.html, 3 pages.
Taghizadeh-Alisaraei et al., "Fault detection of injectors in diesel engines using vibration time-frequency analysis," Applied Acoustics, Jan. 2019, 143:48-58, 11 pages.
Thomassci.com [online], "Multi-Position Hot Plate Stirrer, "2022, retrieved Feb. 15, 2022, retrieved from URL <https://www.thomassci.com/Equipment/Hot-Plates/_/Multi-Position-Hot-Plate-Stirrer?q=Multi%20Position%20Hotplate%20Stirrer>, 2 pages.
Udonne, "A comparative study of recycling of used lubrication Oils using distillation, acid and activated charcoal with clay methods," J. Pet. Gas Eng., Feb. 2011, 2(2):12-19, 8 pages.
U.S. Appl. No. 18/135,533, Nour et al., Magnetic Film Fuel Detector, filed Apr. 17, 2023, 18 pages.
U.S. Appl. No. 18/135,535, Kharashi et al., Hydrocarbon Contaminant Detection Using Polymer Film, filed Apr. 17, 2023, 24 pages.
U.S. Appl. No. 18/135,539, Nour et al., Polymer Film Resistance Fuel Detector, filed Apr. 17, 2023, 19 pages.
U.S. Appl. No. 18/298,776, Nour et al., Detecting Hydrocarbon Fuels in Lubrication Oils, filed Apr. 11, 2023, 23 pages.
U.S. Appl. No. 18/301,581, Kharashi et al., Hydrocarbon Contaminant Detection Using Polymer Film, filed Apr. 17, 2023, 25 pages.
U.S. Appl. No. 18/301,610, Nour et al., Polymer Film Fuel Detector, filed Apr. 17, 2023, 19 pages.
Vahdati et al., "External corrosion detection of oil pipelines using fiber optics." Sensors 20.3, 684, Jan. 2020, 16 pages.
Van-Den-Begin et al., "Fast adsorption-desorption kinetics of hydrocarbons in silicalite-1 by the single-step frequency response method," Zeolites, 9(4): 287-292, Jul. 1989, 6 pages.
Wardzinska et al., "Step response sensitivity of VLSI interconnects," 17th IEEE Workshop on Signal and Power Integrity (SPI), May 12-15, 2013, 4 pages.
Wronski et al., "The step response: a method to characterize mechanisms of renal blood flow autoregulation," American Journal of Physiology—Renal Physiology, Sep. 3, 2003, 285(4): F758-764, 7 pages.
Yamagata et al., "Synthesis of highly fluorescent diketopyrrolopyrrole derivative and two-step response of fluorescence to acid," Tetrahedron Letters, Mar. 24, 2010, 51(12): 1596-1599, 4 pages.
Yang et al., "Determination of sulfur compounds in catalytic diesel oil by gas chromatography with atomic emission detector and its applications," Se Pu, Nov. 2002, Abstract, 2 pages.

(56) References Cited

OTHER PUBLICATIONS

Youn et al., "Fabrication of micro mold for hot-embossing of polyimide microfluidic platform by using electron beam lithography combined with inductively coupled plasma," Microelectron. Eng., 2008, 85( 5-6):918-921, 4 pages.
Yu et al., "A novel polyimide based micro heater with high temperature uniformity," Sensors Actuators, A Phys., Feb. 2017, 257:58-64, 7 pages.
Zhang et al., "Spray model based on step response theory," Fuel, May 2012, 95(1): 499-503, 5 pages.
Zhang et al., "Design of the microfluidic chip of oil detection," Applied Mechanics and Materials, 117-119: 517-520, 2012, 5 pages.
Zhao et al., "Design principles and fabrication method for a miniaturized fuel gas combustion reactor," Sensors, The 3rd Conference on MicroFluidic Handling Systems, Oct. 2017, 4 pages.

\* cited by examiner

THIN POLYMER FILM DISSOLVED UNDER TENSION TO DETECT HYDROCARBON FUELS HIDDEN IN PARAFFIN-BASED LUBRICATION OILS

TECHNICAL FIELD

The present disclosure applies to the detection of additives in oil.

BACKGROUND

Detecting the hydrocarbon fuels hidden by and mixed with lubrication oil is a challenge for the oil and gas industry. As an example, fuel markers are often a primary technology used for limiting smuggling practices. The markers can be achieved by mixing chemical additives with a target fuel. The markers can subsequently be detected using one of many analytical tools. However, fuel markers can be a costly solution, as the practice requires that the markers are added to the fuel at the pump in order to be detected in smuggled fuels. This translates to a waste of most of the markers that are mixed with fuels used legally. Moreover, additive marker amounts are directly related to the target detection concentration, thereby incentivizing the addition of higher concentrations of the additive to be able to detect smuggled fuels in trace quantities.

SUMMARY

The present disclosure describes techniques for using a conductive trace on a micro-thickness of Cyclic Olefin Copolymer (COC) film to detect hydrocarbon fuels. A thin film of a COC layer is sputtered with a conductive trace that completes a circuit. The COC film is suspended under tension and configured to dissolve rapidly upon contact with alkyl aromatic compounds present in hydrocarbon fuels. The dissolution of the COC film breaks the conductive trace, thereby rendering the electrical circuit open. A time duration is measured from the addition of the sample to the opening of the circuit. The time duration is correlated to a concentration of hydrocarbon fuel in the mixture.

In some implementations, a computer-implemented method includes the following. A thin Cyclic Olefin Copolymer (COC) film of a COC layer with a conductive trace that completes an electrical circuit is sputtered. The thin COC film is positioned under tension so that the thin COC film is configured to dissolve upon contact with alkyl aromatic compounds present in hydrocarbon fuels. A sample of a hydrocarbon fuel is positioned on the thin COC film. A determination is made, in response to positioning the sample, that a dissolution of the thin COC film has broken the conductive trace and has rendered the electrical circuit open. A time duration is measured from an introduction of the sample during positioning to an opening of the electrical circuit. A concentration of the hydrocarbon fuel in the sample is determined based on the time duration.

The previously described implementation is implementable using a computer-implemented method; a non-transitory, computer-readable medium storing computer-readable instructions to perform the computer-implemented method; and a computer-implemented system including a computer memory interoperably coupled with a hardware processor configured to perform the computer-implemented method, the instructions stored on the non-transitory, computer-readable medium.

The subject matter described in this specification can be implemented in particular implementations, so as to realize one or more of the following advantages. Costs are reduced for detecting smuggled diesel/gasoline by avoiding the use of the marker additive to the entire fuel production to detect diesel. Also, the use of microfluidic technology allows for reduced power consumption, smaller samples, and more rapid results. Cyclic Olefin Copolymer (COC) microfluidic technologies have been developed in recent years. However, COC microfluidic technologies have not been used for sensor detection of aromatic chains. Techniques of present disclosure provide a detection mechanism using the sheet resistance of the COC for quantifying the concentration of aromatic chains. Several available technologies address diesel/gasoline mixtures with hydrocarbons, but most of them are based on the fuel marker technology. The techniques of present disclosure are different because the techniques can detect diesel without the need for fuel marker technology. The techniques can be utilized as aromatic hydrocarbon detection without the need to add fuel markers to the fuel at the pump. This mitigates the cost of detection, as spectroscopic techniques are not needed for detection.

The details of one or more implementations of the subject matter of this specification are set forth in the Detailed Description, the accompanying drawings, and the claims. Other features, aspects, and advantages of the subject matter will become apparent from the Detailed Description, the claims, and the accompanying drawings.

DESCRIPTION OF DRAWINGS

Like reference numbers and designations in the various drawings indicate like elements.

DETAILED DESCRIPTION

Figure 1:
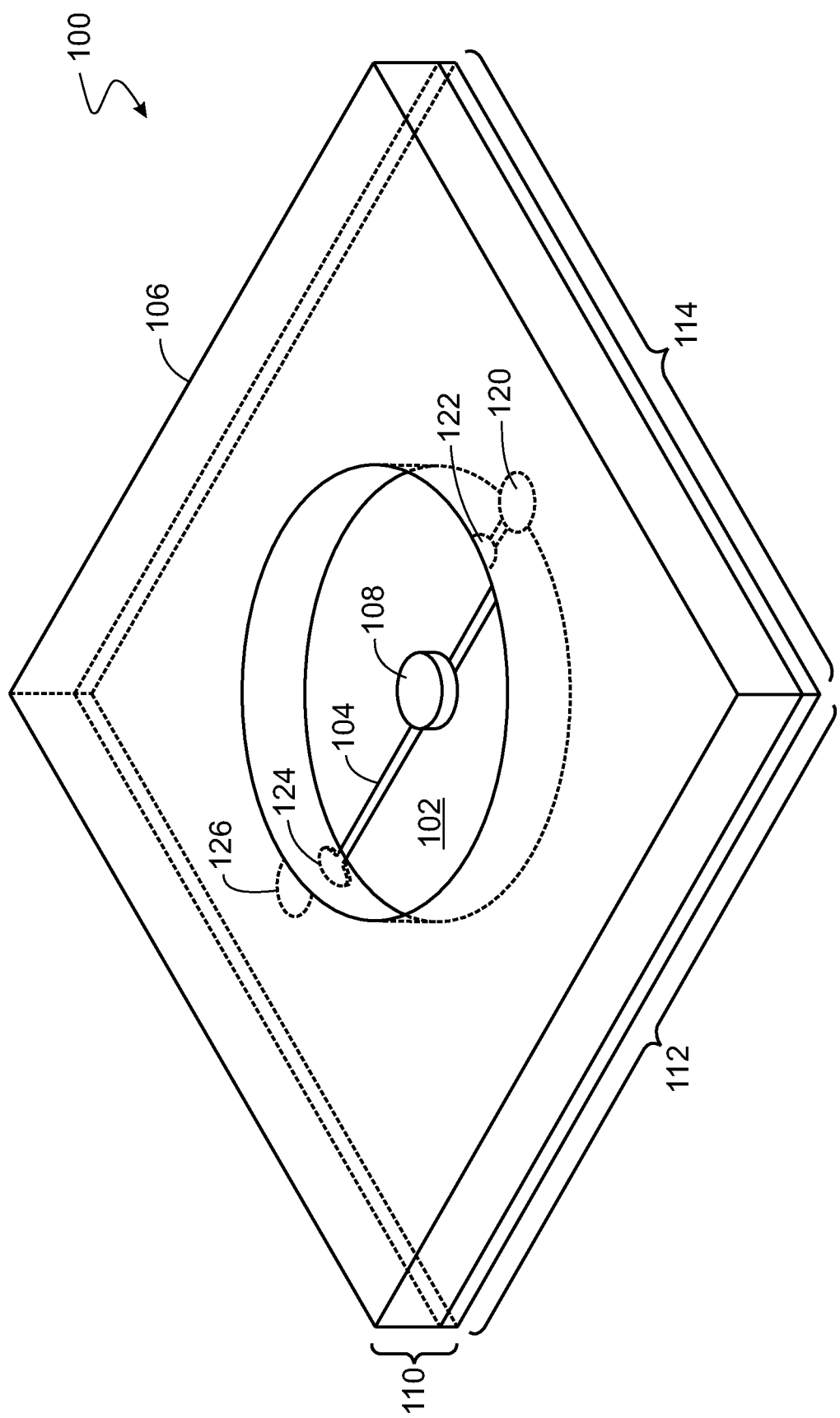
FIG. 1 is a diagram showing an example of a device including a thin conductive trace on a micro-thickness COC film for detecting hydrocarbon fuels, according to some implementations of the present disclosure.

The following detailed description describes techniques for using a thin conductive trace on a micro-thickness Cyclic Olefin Copolymer (COC) film for detecting hydrocarbon fuels. Various modifications, alterations, and permutations of the disclosed implementations can be made and will be readily apparent to those of ordinary skill in the art, and the general principles defined may be applied to other implementations and applications, without departing from the scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

The techniques of the present disclosure are designed to detect hydrocarbon fuel concentrations in paraffin-based lubrication oil mixtures to limit fuel smuggling practices without using chemical additives. The techniques are based on the use of a thin film of a COC layer sputtered with a conductive trace that completes a circuit. The COC film is suspended under tension and dissolves rapidly upon contact with alkyl aromatic compounds present in hydrocarbon fuels. The dissolution of the COC film breaks the conductive trace, thereby rendering the electrical circuit open. The time measured from the addition of the sample to the opening of the circuit can be correlated to the concentration of the hydrocarbon fuel in the mixture. A table can be used that correlates the time duration to a concentration of hydrocarbon fuel in the mixture, thus supporting a table look-up (and interpolation, as needed) to determine the concentration. The COC thin film dissolves faster at higher concentration of the solvents such as in gasoline than in diesel because the diesel has a lower percentage of aromatic hydrocarbons. On the other hand, the COC dissolves faster at 100% of diesel (e.g., in few seconds) than in diesel mixed with lubrication oil (that can reach to hours in case of low concentrations below 1%).

The techniques of the present disclosure are designed to detect hydrocarbon fuels in hidden lubrication oil mixtures to combat criminal exploitation and illegal acts using a thin film of COC coated with a conductive trace. COC dissolves in aromatic chain chemicals, such as benzene, which is present in hydrocarbon fuels. On the other hand, it is insoluble in paraffin solvents, such as high viscous lubrication oils. The innovation detects the fuels by monitoring the dissolution time of the COC thin film. The conductive trace on the COC film is used to complete a circuit, which is opened when the film dissolves. The dissolving rate of the COC sheet depends on the COC thickness, the wall width of the COC, and the contact surface area of the COC with the aromatic fluid. Moreover, the aromatic concentration in the solution can influence the dissolving rate.

FIG. 1 is a diagram showing an example of a device 100 including a thin conductive trace on a micro-thickness COC film for detecting hydrocarbon fuels, according to some implementations of the present disclosure. The device 100 consists of a thin COC sheet 102 sputtered with a thin conductive trace 104 (conductive metal sputtered onto the COC sheet 102, such as one or more conductive metals Au, Cu, or Al. The thin conductive trace 104 breaks upon the dissolution of the thin COC sheet 102. The thin COC sheet 102 remains under tension as it is clamped in a tight frame 106 and loaded with a central weight 108. Example dimensions of the tight frame 106 include a thickness 110, a length 112, and a width 114. The device 100 includes conductive pads 120-126 at the ends of the thin conductive trace 104 that can be connected to an LED circuit. The thickness of the conductive metal can be, for example, 150-200 nm. The thickness of the COC sheet can be 1 to 10 microns. In some cases, the COC sheet 102 thickness can vary, e.g., in a range from 15 micrometers ($\mu$m) to 0.5 $\mu$m. A wall thickness of the tight frame 106 can be in the range from 20 $\mu$m to 5 $\mu$m.

The COC can be acquired in a crystal form, for example, and converted to a solution by dissolving it in toluene. Then, the COC can be spin coated on a glass substrate. The rotating speed and the concentration of the COC in the solvents can control the thickness of the COC layer. Finally, the solvent can be evaporated through a baking process, which hardens the film. The film can be released via quick submersion in acetone, which generates sufficient film stress at the edges thereby allowing it to be peeled off with tweezers. The metal trace line can be sputtered using a lithography process or a shadow mask. The clamps can be fabricated using carbon dioxide ($CO_2$), laser, or mechanical processes and attached to the substrate using mechanical clips, adhesive methods, or solvents.

An experiment including video camera/mobile recording was conducted using a fuse in a circuit for driving an LED. The mixture used in the experiment was decanted using a fixed-volume pipette. The video feed was utilized to determine the time lapse between decanting the fluid and the LED going off. In some implementations, a potentiostat can be connected to also monitor the current and monitor changes in the resistance of the trace as the COC dissolves.

For examination, a few milliliters volume of fluid sample can be placed in the open area, and the conductivity of the metal trace can be monitored. In case the fluid sample contains aromatic chains, then it will dissolve the COC causing an open circuit. Otherwise, the sheet will remain conductive. The response and results show up immediately or within a few minutes.

Figure 2:
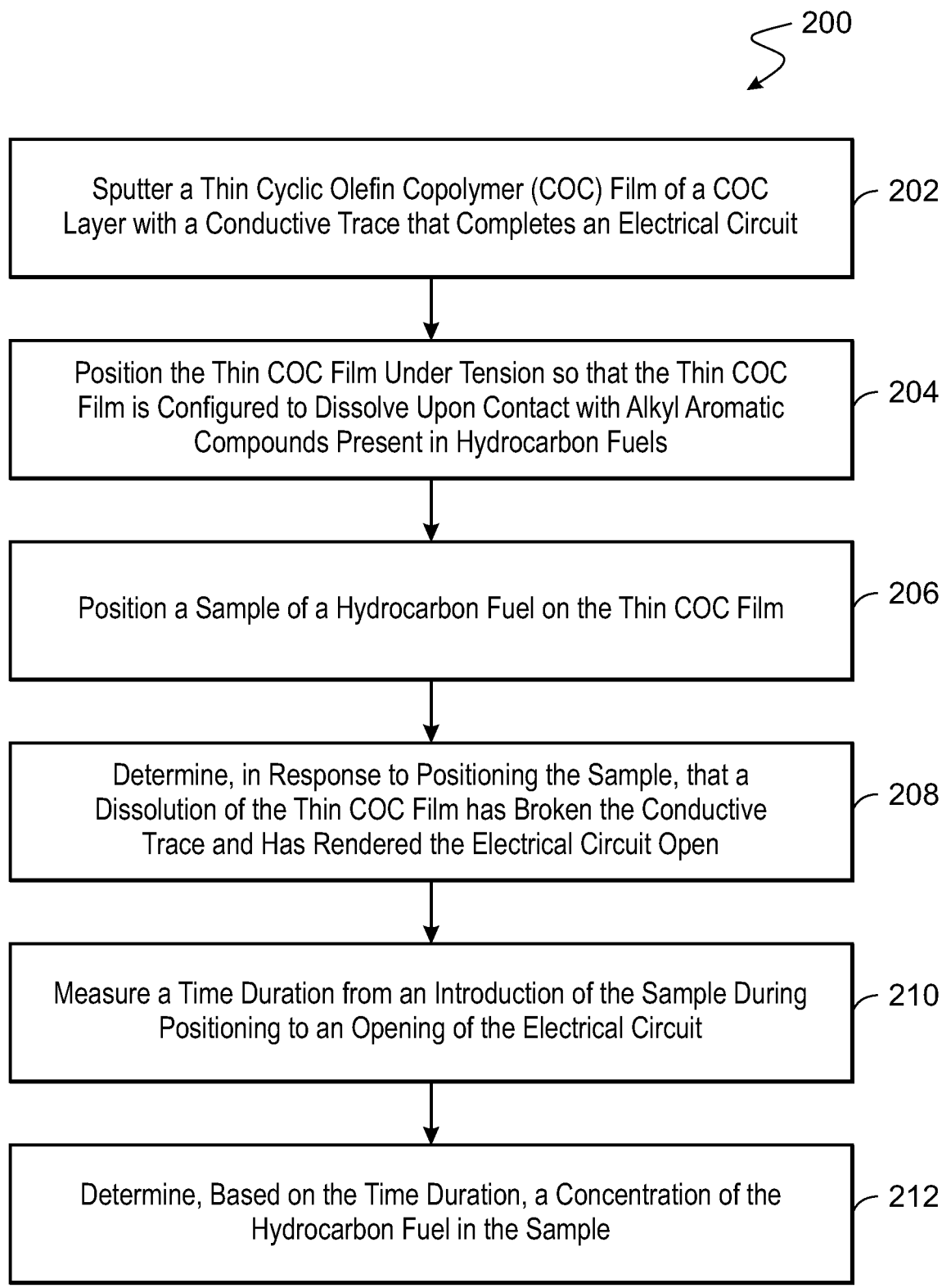
FIG. 2 is a flowchart of an example of a method for using a conductive trace on a micro-thickness of Cyclic Olefin Copolymer (COC) film to detect hydrocarbon fuels, according to some implementations of the present disclosure.

FIG. 2 is a flowchart of an example of a method 200 for using a conductive trace on a micro-thickness of Cyclic Olefin Copolymer (COC) film to detect hydrocarbon fuels, according to some implementations of the present disclosure. For clarity of presentation, the description that follows generally describes method 200 in the context of the other figures in this description. However, it will be understood that method 200 can be performed, for example, by any suitable system, environment, software, and hardware, or a combination of systems, environments, software, and hardware, as appropriate. In some implementations, various steps of method 200 can be run in parallel, in combination, in loops, or in any order.

At 202, a thin Cyclic Olefin Copolymer (COC) film of a COC layer (e.g., a substrate) with a conductive trace that completes an electrical circuit is sputtered. For example, the thin COC sheet 102 sputtered with a thin conductive trace 104. Sputtering the thin COC film can use a lithography process or a shadow mask, for example. The thickness of the thin COC film can be in the range of 0.5 micrometers ($\mu$m) to 15 $\mu$m. The thin COC film can be positioned in a tight frame having a thickness in a range from 5 $\mu$m to 20 $\mu$m. The conductive trace can be made using any conductive material, e.g., metals such as Au, Cu, Ag, and Al. The thickness can vary from 150 nm to 200 nm. A shadow mask can be used to create the pattern of the conductive layer. From 202, method 200 proceeds to 204.

At 204, the thin COC film is positioned under tension so that the thin COC film is configured to dissolve upon contact with alkyl aromatic compounds present in hydrocarbon fuels. For example, the thin COC sheet 102 can be mounted under tension as it is clamped in the tight frame 106 and loaded with the central weight 108. From 204, method 200 proceeds to 206.

At 206, a sample of a hydrocarbon fuel is positioned on the thin COC film. For example, a sample to be tested can be dropped or introduced into the opening in the tight frame 106 in which the thin conductive trace 104 is exposed. From 206, method 200 proceeds to 208.

At 208, a determination is made, in response to positioning the sample, that a dissolution of the thin COC film has broken the conductive trace and has rendered the electrical circuit open. For example, the thin conductive trace 104 can break upon the dissolution of the thin COC sheet 102. From 208, method 200 proceeds to 210.

At 210, a time duration is measured from an introduction of the sample during positioning to an opening of the electrical circuit. For example, a timer started at the time of introducing the sample can be stopped automatically upon detection of the opened electrical circuit. This time can be stored for immediate or later use. From 210, method 200 proceeds to 212.

At 212, a concentration of the hydrocarbon fuel in the sample is determined based on the time duration. As an example, a table look-up or an equation can be used that defines relationships between the time duration and the concentration, and optionally a temperature and/or other parameters associated with the sample. After 212, method 200 can stop.

In some implementations, in addition to (or in combination with) any previously-described features, techniques of the present disclosure can include the following. Outputs of the techniques of the present disclosure can be performed before, during, or in combination with wellbore operations, such as to provide inputs to change the settings or parameters of equipment used for drilling. Examples of wellbore operations include forming/drilling a wellbore, hydraulic fracturing, and producing through the wellbore, to name a few. The wellbore operations can be triggered or controlled, for example, by outputs of the methods of the present disclosure. In some implementations, customized user interfaces can present intermediate or final results of the above described processes to a user. Information can be presented in one or more textual, tabular, or graphical formats, such as through a dashboard. The information can be presented at one or more on-site locations (such as at an oil well or other facility), on the Internet (such as on a webpage), on a mobile application (or "app"), or at a central processing facility. The presented information can include suggestions, such as suggested changes in parameters or processing inputs, that the user can select to implement improvements in a production environment, such as in the exploration, production, and/or testing of petrochemical processes or facilities. For example, the suggestions can include parameters that, when selected by the user, can cause a change to, or an improvement in, drilling parameters (including drill bit speed and direction) or overall production of a gas or oil well. The suggestions, when implemented by the user, can improve the speed and accuracy of calculations, streamline processes, improve models, and solve problems related to efficiency, performance, safety, reliability, costs, downtime, and the need for human interaction. In some implementations, the suggestions can be implemented in real-time, such as to provide an immediate or near-immediate change in operations or in a model. The term real-time can correspond, for example, to events that occur within a specified period of time, such as within one minute or within one second. Events can include readings or measurements captured by downhole equipment such as sensors, pumps, bottom hole assemblies, or other equipment. The readings or measurements can be analyzed at the surface, such as by using applications that can include modeling applications and machine learning. The analysis can be used to generate changes to settings of downhole equipment, such as drilling equipment. In some implementations, values of parameters or other variables that are determined can be used automatically (such as through using rules) to implement changes in oil or gas well exploration, production/drilling, or testing. For example, outputs of the present disclosure can be used as inputs to other equipment and/or systems at a facility. This can be especially useful for systems or various pieces of equipment that are located several meters or several miles apart, or are located in different countries or other jurisdictions.

Figure 3:
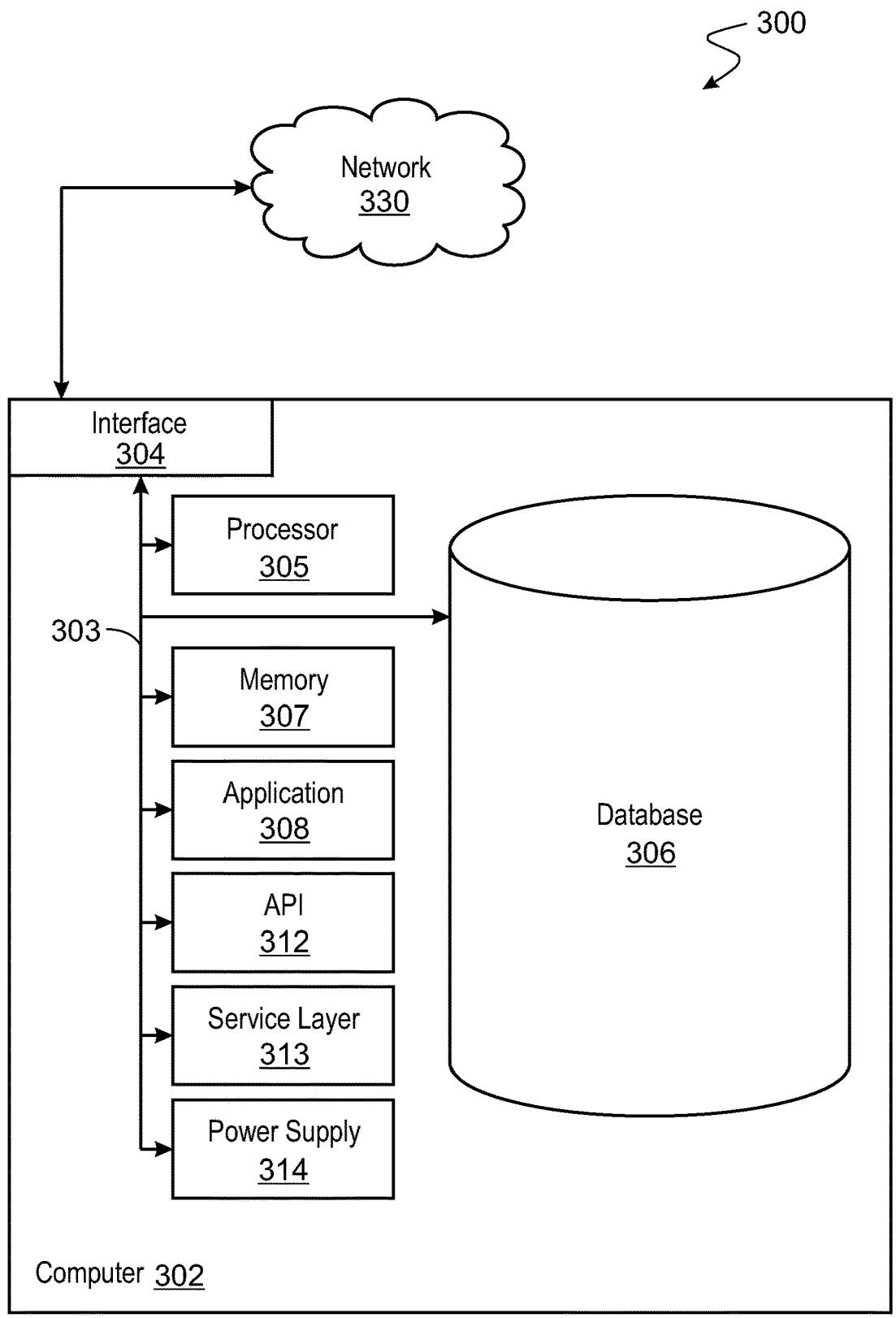
FIG. 3 is a block diagram illustrating an example computer system used to provide computational functionalities associated with described algorithms, methods, functions, processes, flows, and procedures as described in the present disclosure, according to some implementations of the present disclosure.

FIG. 3 is a block diagram of an example computer system 300 used to provide computational functionalities associated with described algorithms, methods, functions, processes, flows, and procedures described in the present disclosure, according to some implementations of the present disclosure. The illustrated computer 302 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 302 can include input devices such as keypads, keyboards, and touch screens that can accept user information. Also, the computer 302 can include output devices that can convey information associated with the operation of the computer 302. The information can include digital data, visual data, audio information, or a combination of information. The information can be presented in a graphical user interface (UI) (or GUI).

The computer 302 can serve in a role as a client, a network component, a server, a database, a persistency, or components of a computer system for performing the subject matter described in the present disclosure. The illustrated computer 302 is communicably coupled with a network 330. In some implementations, one or more components of the computer 302 can be configured to operate within different environments, including cloud-computing-based environments, local environments, global environments, and combinations of environments.

At a top level, the computer 302 is an electronic computing device operable to receive, transmit, process, store, and manage data and information associated with the described subject matter. According to some implementations, the computer 302 can also include, or be communicably coupled with, an application server, an email server, a web server, a caching server, a streaming data server, or a combination of servers.

The computer 302 can receive requests over network 330 from a client application (for example, executing on another computer 302). The computer 302 can respond to the received requests by processing the received requests using software applications. Requests can also be sent to the computer 302 from internal users (for example, from a command console), external (or third) parties, automated applications, entities, individuals, systems, and computers.

Each of the components of the computer 302 can communicate using a system bus 303. In some implementations, any or all of the components of the computer 302, including hardware or software components, can interface with each other or the interface 304 (or a combination of both) over the system bus 303. Interfaces can use an application programming interface (API) 312, a service layer 313, or a combination of the API 312 and service layer 313. The API 312 can include specifications for routines, data structures, and object classes. The API 312 can be either computer-language independent or dependent. The API 312 can refer to a complete interface, a single function, or a set of APIs.

The service layer 313 can provide software services to the computer 302 and other components (whether illustrated or not) that are communicably coupled to the computer 302. The functionality of the computer 302 can be accessible for all service consumers using this service layer. Software services, such as those provided by the service layer 313, can provide reusable, defined functionalities through a defined interface. For example, the interface can be software written in JAVA, C++, or a language providing data in extensible markup language (XML) format. While illustrated as an integrated component of the computer 302, in alternative implementations, the API 312 or the service layer 313 can be stand-alone components in relation to other components of the computer 302 and other components communicably coupled to the computer 302. Moreover, any or all parts of the API 312 or the service layer 313 can be implemented as child or sub-modules of another software module, enterprise application, or hardware module without departing from the scope of the present disclosure.

The computer 302 includes an interface 304. Although illustrated as a single interface 304 in FIG. 3, two or more interfaces 304 can be used according to particular needs, desires, or particular implementations of the computer 302 and the described functionality. The interface 304 can be used by the computer 302 for communicating with other systems that are connected to the network 330 (whether illustrated or not) in a distributed environment. Generally, the interface 304 can include, or be implemented using, logic encoded in software or hardware (or a combination of software and hardware) operable to communicate with the network 330. More specifically, the interface 304 can include software supporting one or more communication protocols associated with communications. As such, the network 330 or the interface's hardware can be operable to communicate physical signals within and outside of the illustrated computer 302.

The computer 302 includes a processor 305. Although illustrated as a single processor 305 in FIG. 3, two or more processors 305 can be used according to particular needs, desires, or particular implementations of the computer 302 and the described functionality. Generally, the processor 305 can execute instructions and can manipulate data to perform the operations of the computer 302, including operations using algorithms, methods, functions, processes, flows, and procedures as described in the present disclosure.

The computer 302 also includes a database 306 that can hold data for the computer 302 and other components connected to the network 330 (whether illustrated or not). For example, database 306 can be an in-memory, conventional, or a database storing data consistent with the present disclosure. In some implementations, database 306 can be a combination of two or more different database types (for example, hybrid in-memory and conventional databases) according to particular needs, desires, or particular implementations of the computer 302 and the described functionality. Although illustrated as a single database 306 in FIG. 3, two or more databases (of the same, different, or a combination of types) can be used according to particular needs, desires, or particular implementations of the computer 302 and the described functionality. While database 306 is illustrated as an internal component of the computer 302, in alternative implementations, database 306 can be external to the computer 302.

The computer 302 also includes a memory 307 that can hold data for the computer 302 or a combination of components connected to the network 330 (whether illustrated or not). Memory 307 can store any data consistent with the present disclosure. In some implementations, memory 307 can be a combination of two or more different types of memory (for example, a combination of semiconductor and magnetic storage) according to particular needs, desires, or particular implementations of the computer 302 and the described functionality. Although illustrated as a single memory 307 in FIG. 3, two or more memories 307 (of the same, different, or combination of types) can be used according to particular needs, desires, or particular implementations of the computer 302 and the described functionality.

While memory 307 is illustrated as an internal component of the computer 302, in alternative implementations, memory 307 can be external to the computer 302.

The application 308 can be an algorithmic software engine providing functionality according to particular needs, desires, or particular implementations of the computer 302 and the described functionality. For example, application 308 can serve as one or more components, modules, or applications. Further, although illustrated as a single application 308, the application 308 can be implemented as multiple applications 308 on the computer 302. In addition, although illustrated as internal to the computer 302, in alternative implementations, the application 308 can be external to the computer 302.

The computer 302 can also include a power supply 314. The power supply 314 can include a rechargeable or non-rechargeable battery that can be configured to be either user- or non-user-replaceable. In some implementations, the power supply 314 can include power-conversion and management circuits, including recharging, standby, and power management functionalities. In some implementations, the power supply 314 can include a power plug to allow the computer 302 to be plugged into a wall socket or a power source to, for example, power the computer 302 or recharge a rechargeable battery.

There can be any number of computers 302 associated with, or external to, a computer system containing computer 302, with each computer 302 communicating over network 330. Further, the terms "client," "user," and other appropriate terminology can be used interchangeably, as appropriate, without departing from the scope of the present disclosure. Moreover, the present disclosure contemplates that many users can use one computer 302 and one user can use multiple computers 302.

Described implementations of the subject matter can include one or more features, alone or in combination.

For example, in a first implementation, a computer-implemented method includes the following. A thin Cyclic Olefin Copolymer (COC) film of a COC layer with a conductive trace that completes an electrical circuit is sputtered. The thin COC film is positioned under tension so that the thin COC film is configured to dissolve upon contact with alkyl aromatic compounds present in hydrocarbon fuels. A sample of a hydrocarbon fuel is positioned on the thin COC film. A determination is made, in response to positioning the sample, that a dissolution of the thin COC film has broken the conductive trace and has rendered the electrical circuit open. A time duration is measured from an introduction of the sample during positioning to an opening of the electrical circuit. A concentration of the hydrocarbon fuel in the sample is determined based on the time duration.

The foregoing and other described implementations can each, optionally, include one or more of the following features:

A first feature, combinable with any of the following features, where sputtering the thin COC film uses a lithography process.

A second feature, combinable with any of the previous or following features, where sputtering the thin COC film uses a shadow mask.

A third feature, combinable with any of the previous or following features, where the thin COC film is clamped in a tight frame and loaded with a central weight.

A fourth feature, combinable with any of the previous or following features, where a thickness of the thin COC film is in a range of 0.5 micrometers ($\mu m$) to 15 $\mu m$.

A fifth feature, combinable with any of the previous or following features, where the thin COC film is positioned in a tight frame having a thickness in a range from 5 μm to 20 μm.

A sixth feature, combinable with any of the previous or following features, where the conductive trace is made from one or more metals including Au, Cu, Ag, and Al.

In a second implementation, a non-transitory, computer-readable medium stores one or more instructions executable by a computer system to perform operations including the following. A thin Cyclic Olefin Copolymer (COC) film of a COC layer with a conductive trace that completes an electrical circuit is sputtered. The thin COC film is positioned under tension so that the thin COC film is configured to dissolve upon contact with alkyl aromatic compounds present in hydrocarbon fuels. A sample of a hydrocarbon fuel is positioned on the thin COC film. A determination is made, in response to positioning the sample, that a dissolution of the thin COC film has broken the conductive trace and has rendered the electrical circuit open. A time duration is measured from an introduction of the sample during positioning to an opening of the electrical circuit. A concentration of the hydrocarbon fuel in the sample is determined based on the time duration.

The foregoing and other described implementations can each, optionally, include one or more of the following features:

A first feature, combinable with any of the following features, where sputtering the thin COC film uses a lithography process.

A second feature, combinable with any of the previous or following features, where sputtering the thin COC film uses a shadow mask.

A third feature, combinable with any of the previous or following features, where the thin COC film is clamped in a tight frame and loaded with a central weight.

A fourth feature, combinable with any of the previous or following features, where a thickness of the thin COC film is in a range of 0.5 micrometers (μm) to 15 μm.

A fifth feature, combinable with any of the previous or following features, where the thin COC film is positioned in a tight frame having a thickness in a range from 5 μm to 20 μm.

A sixth feature, combinable with any of the previous or following features, where the conductive trace is made from one or more metals including Au, Cu, Ag, and Al.

In a third implementation, a computer-implemented system includes one or more processors and a non-transitory computer-readable storage medium coupled to the one or more processors and storing programming instructions for execution by the one or more processors. The programming instructions instruct the one or more processors to perform operations including the following. A thin Cyclic Olefin Copolymer (COC) film of a COC layer with a conductive trace that completes an electrical circuit is sputtered. The thin COC film is positioned under tension so that the thin COC film is configured to dissolve upon contact with alkyl aromatic compounds present in hydrocarbon fuels. A sample of a hydrocarbon fuel is positioned on the thin COC film. A determination is made, in response to positioning the sample, that a dissolution of the thin COC film has broken the conductive trace and has rendered the electrical circuit open. A time duration is measured from an introduction of the sample during positioning to an opening of the electrical circuit. A concentration of the hydrocarbon fuel in the sample is determined based on the time duration.

The foregoing and other described implementations can each, optionally, include one or more of the following features:

A first feature, combinable with any of the following features, where sputtering the thin COC film uses a lithography process.

A second feature, combinable with any of the previous or following features, where sputtering the thin COC film uses a shadow mask.

A third feature, combinable with any of the previous or following features, where the thin COC film is clamped in a tight frame and loaded with a central weight.

A fourth feature, combinable with any of the previous or following features, where a thickness of the thin COC film is in a range of 0.5 micrometers (μm) to 15 μm.

A fifth feature, combinable with any of the previous or following features, where the thin COC film is positioned in a tight frame having a thickness in a range from 5 μm to 20 μm.

A sixth feature, combinable with any of the previous or following features, where the conductive trace is made from one or more metals including Au, Cu, Ag, and Al.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. For example, the signal can be a machine-generated electrical, optical, or electromagnetic signal that is generated to encode information for transmission to a suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatuses, devices, and machines for processing data, including by way of example, a programmable processor, a computer, or multiple processors or computers. The apparatus can also include special purpose logic circuitry including, for example, a central processing unit (CPU), a field-programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, such as LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory.

Graphics processing units (GPUs) can also be used in combination with CPUs. The GPUs can provide specialized processing that occurs in parallel to processing performed by CPUs. The specialized processing can include artificial intelligence (AI) applications and processing, for example. GPUs can be used in GPU clusters or in multi-GPU computing.

A computer can include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated into, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that the user uses. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch-screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at the application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations. It should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

What is claimed is:

1. A method for detecting hydrocarbon fuels, the method comprising:
   sputtering, by using a lithography process or a shadow mask, a thin Cyclic Olefin Copolymer (COC) film of a COC layer with a conductive trace line that completes an electrical circuit;
   positioning, by clamping, the thin COC film under tension, wherein the thin COC film is in a hardened form configured to dissolve upon contact with alkyl aromatic compounds present in hydrocarbon fuels;
   positioning a sample of a hydrocarbon fuel on the thin COC film;
   determining, by using a potentiostat, in response to positioning the sample, that a dissolution of the thin COC film broke the conductive trace line and rendered the electrical circuit open;
   measuring, by using a video feed, a time duration from an introduction of the sample during positioning to an opening of the electrical circuit; and
   determining, based on the time duration, a concentration of the hydrocarbon fuel in the sample.

2. The method of claim 1, wherein sputtering the thin COC film uses a lithography process.

3. The method of claim 1, wherein sputtering the thin COC film uses a shadow mask.

4. The method of claim 1, wherein the thin COC film is clamped in a tight frame and loaded with a central weight.

5. The method of claim 1, wherein a thickness of the thin COC film is in a range of 0.5 micrometers ($\mu m$) to 15 $\mu m$.

6. The method of claim 1, wherein the thin COC film is positioned in a tight frame having a thickness in a range from 5 $\mu m$ to 20 $\mu m$.

7. The method of claim 1, wherein the conductive trace line is made from one or more metals including Au, Cu, Ag, and Al.

8. An apparatus for detecting hydrocarbon fuels, the apparatus comprising:
   a thin Cyclic Olefin Copolymer (COC) film of a COC layer sputtered, by using a lithography process or a shadow mask, with a conductive trace line that completes an electrical circuit, wherein positioning the thin COC film is positioned under tension, by clamping, wherein the thin COC film is configured to dissolve upon contact with alkyl aromatic compounds present in hydrocarbon fuels, and wherein a sample of a hydrocarbon fuel is positioned on the thin COC film;

a potentiostat for determining, in response to positioning the sample, that a dissolution of the thin COC film broke the conductive trace line and rendered the electrical circuit open;

an image recording apparatus for measuring a time duration from an introduction of the sample during positioning to an opening of the electrical circuit; and a non-transitory computer-readable storage medium coupled to one or more processors and storing programming instructions for execution by the one or more processors, the programming instructions instructing the one or more processors to perform operations comprising determining, based on the time duration, a concentration of the hydrocarbon fuel in the sample.

9. The apparatus of claim 8, wherein sputtering the thin COC film uses a lithography process.

10. The apparatus of claim 8, wherein sputtering the thin COC film uses a shadow mask.

11. The apparatus of claim 8, wherein the thin COC film is clamped in a tight frame and loaded with a central weight.

12. The apparatus of claim 8, wherein a thickness of the thin COC film is in a range of 0.5 micrometers (μm) to 15 μm.

13. The apparatus of claim 8, wherein the thin COC film is positioned in a tight frame having a thickness in a range from 5 μm to 20 μm.

14. The apparatus of claim 8, wherein the conductive trace line is made from one or more metals including Au, Cu, Ag, and Al.

15. A system for detecting hydrocarbon fuels, the system, comprising:

an apparatus for sputtering, by using a lithography process or a shadow mask, a thin Cyclic Olefin Copolymer (COC) film of a COC layer with a conductive trace line that completes an electrical circuit, wherein the thin COC film is positioned under tension, by clamping, wherein the thin COC film is configured to dissolve upon contact with alkyl aromatic compounds present in hydrocarbon fuels, and wherein a sample of a hydrocarbon fuel is positioned on the thin COC film;

a potentiostat for determining, in response to positioning the sample, that a dissolution of the thin COC film broke the conductive trace line and rendered the electrical circuit open;

an image recording apparatus for measuring a time duration from an introduction of the sample during positioning to an opening of the electrical circuit; and a non-transitory computer-readable storage medium coupled to one or more processors and storing programming instructions for execution by the one or more processors, the programming instructions instructing the one or more processors to perform operations comprising determining, based on the time duration, a concentration of the hydrocarbon fuel in the sample.

16. The system of claim 15, wherein sputtering the thin COC film uses a lithography process.

17. The system of claim 15, wherein sputtering the thin COC film uses a shadow mask.

18. The system of claim 15, wherein the thin COC film is clamped in a tight frame and loaded with a central weight.

19. The system of claim 15, wherein a thickness of the thin COC film is in a range of 0.5 micrometers (μm) to 15 μm.

20. The system of claim 15, wherein the thin COC film is positioned in a tight frame having a thickness in a range from 5 μm to 20 μm.

* * * * *